United States Patent [19]
Kanoh et al.

[11] Patent Number: 5,272,520
[45] Date of Patent: Dec. 21, 1993

[54] CIF CONVERTER WITH REDUCED MULTIPLIERS

[75] Inventors: Toshiyuki Kanoh; Akihiro Shiratori; Chizuru Matsumura, all of Tokyo, Japan

[73] Assignee: NEC Corporation, Japan

[21] Appl. No.: 865,304

[22] Filed: Apr. 8, 1992

[30] Foreign Application Priority Data

Apr. 8, 1991 [JP] Japan ............................ 3-103828

[51] Int. Cl.5 ........................................ H04N 11/20
[52] U.S. Cl. ........................................ 358/11; 358/12
[58] Field of Search ............... 358/11, 12, 140, 141

[56] References Cited

U.S. PATENT DOCUMENTS 4,587,556  5/1986  Collins .................................. 358/11

OTHER PUBLICATIONS

Signal Processing of HDTV, II; Proceedings of the Third International Workshop of HDTV, Turin, Ital, Aug. 30-Sep. 1, 1989, (1990 Ed.), pp. 587-594, A Flexible Architecture for a HDTV Codec Based on DCT, Mario Barbero et al.

IEEE International Solid State Circuits Conference, No. 31, Feb. 17, 1988, New York, pp. 156-157, 344; A 20-ns CMOS Micro-DSP Core for Video-Signal Processing, Baji et al.

IEEE Journal on Selected Areas in Communication, vol. 6, No. 3, Apr. 1988, New York, pp. 513-519, A Single-Board Video Signal Processor Module Employing Newly Developed LSI Devices, Harasaki et al.

IEEE Global Telecommunications Conference & Exhibition, "Communications for the Information Age", Hollywood, Fla., Motion Video Coding in CCITT SG XV—The Codec Picture Format, Nicol et al., Nov. 28-Dec. 1, 1988.

*Primary Examiner*—Victor R. Kostak
*Attorney, Agent, or Firm*—Ostrolenk, Faber, Gerb & Soffen

[57] ABSTRACT

A CIF converter has N multipliers (where N is smaller than five) and N integrators connected respectively to the outputs of the N multipliers. Every five horizontal lines of an input NTSC or PAL television signal is stored in memory. On a pixel-by-pixel basis first and second half segments of a luminance component of the stored lines and I and Q chrominance components of the stored lines are transferred from corresponding pixel positions of the memory to the N multipliers at a speed higher than the speed at which the input signal is stored into the memory, and weighted by tap weight coefficients having unique values corresponding respectively to the five horizontal lines. The weighted five-line pixel data of each of the video signal components are then summed by each integrator and stored back into the memory and sequentially read therefrom at a speed equal to the writing speed.

8 Claims, 9 Drawing Sheets

CIF CONVERTER WITH REDUCED MULTIPLIERS

BACKGROUND OF THE INVENTION

The present invention relates generally to a video communications systems, and more specifically to the conversion of a color television signal in the NTSC (National Television Standard Committee) or PAL (Phase Alternation by Line) system format into a common intermediate format (CIF) standardized by CCITT.

A conventional CIF converter comprises a series of five memories for respectively storing successive five horizontal lines of an NTSC or PAL signal to produce a set of pixel data spaced a horizontal line apart from each other. Five multipliers are respectively connected to the outputs of the memories to multiply the pixel data with tap weight coefficients. The multiplied data are summed together to produce a single-line output signal for transmission. It is the current practice to implement the CIF converter using LSI technology.

Since a multiplier is made up of complex logic elements, it occupies a substantial amount of space in an LSI chip and dissipates a substantial amount of power. It has therefore been desired to reduce the number of multipliers required to implement a CIF converter.

SUMMARY OF THE INVENTION

It is therefore an object of the present invention to provide a CIF converter which allows implementation with a smaller chip size and reduced power dissipation by reducing multipliers.

The number of multipliers is reduced to four by equally dividing a luminance component into first and second half segments and treating them in the same way as chrominance components are treated.

According to a broader aspect of the present invention, a common intermediate format converter is provided which comprises N multipliers (where N is smaller than five) and N integrators connected respectively to the outputs of the N multipliers. Every five horizontal lines of an input color television signal of NTSC or PAL system format is stored in memory. On a pixel-by-pixel basis first and second half segments of a luminance component of the stored lines and I and Q chrominance components of the stored lines are read and transferred from corresponding pixel positions of the memory to the N multipliers at a speed higher than the speed at which the input signal is stored into the memory. Supplied to the N multipliers are tap weight coefficients having unique values corresponding respectively to the five horizontal lines so that five-line pixel data of each of the video signal components are weighted by each multiplier and summed by each integrator. The outputs of the N integrators are stored back into the memory and sequentially transferred from the memory at a speed equal to the writing speed.

According to a first specific aspect of the present invention, the CIF converter comprises first, second, third and fourth multipliers. First, second, third and fourth integrators are connected respectively to the outputs of the first, second, third and fourth multipliers. On a pixel-by-pixel basis, first and second half segments of a luminance component and I and Q chrominance components of the stored lines are read and transferred from corresponding pixel positions of the memory to the first, second, third and fourth multipliers respectively at a speed higher than the speed at which the input signal is stored. The tap weight coefficients are supplied to the first, second, third and fourth multipliers. The transferred pixel data are weighted by the multipliers and summed by the integrators, whose outputs are stored back into the memory and sequentially read therefrom at the writing speed.

A further reduction of multipliers is achieved by equally dividing one of an I-chrominance component into first and second half segments and time-sharing a first miltiplier with the first half segments of the luminance and I-chrominance component and time-sharing a second multiplier with the second half segments of the luminance and I-chrominance components.

According to a second specific aspect, the CIF converter of this invention comprises first, second and third multipliers. First, second and third integrators are connected respectively to the outputs of the first, second and third multipliers. From corresponding pixel positions of the stored lines a first half segment of the luminance component and a first half segment of the I chrominance component are transferred to the first multiplier, and a second half segment of the luminance component and a second half segment of the I chrominance component are transferred to the second multiplier, with the Q chrominance component being transferred to the third multiplier. The tap weight coefficients are supplied to the first, second and third multipliers in which the transferred pixel data are weighted. The weighted data from each multiplier are integrated by the respective integrator. The outputs of the integrators are into the memory and sequentially read therefrom at the writing speed.

BRIEF DESCRIPTION OF THE DRAWINGS

The present invention will be described in further detail with reference to the accompanying drawings, in which.

DETAILED DESCRIPTION

Figures 1, 1A:
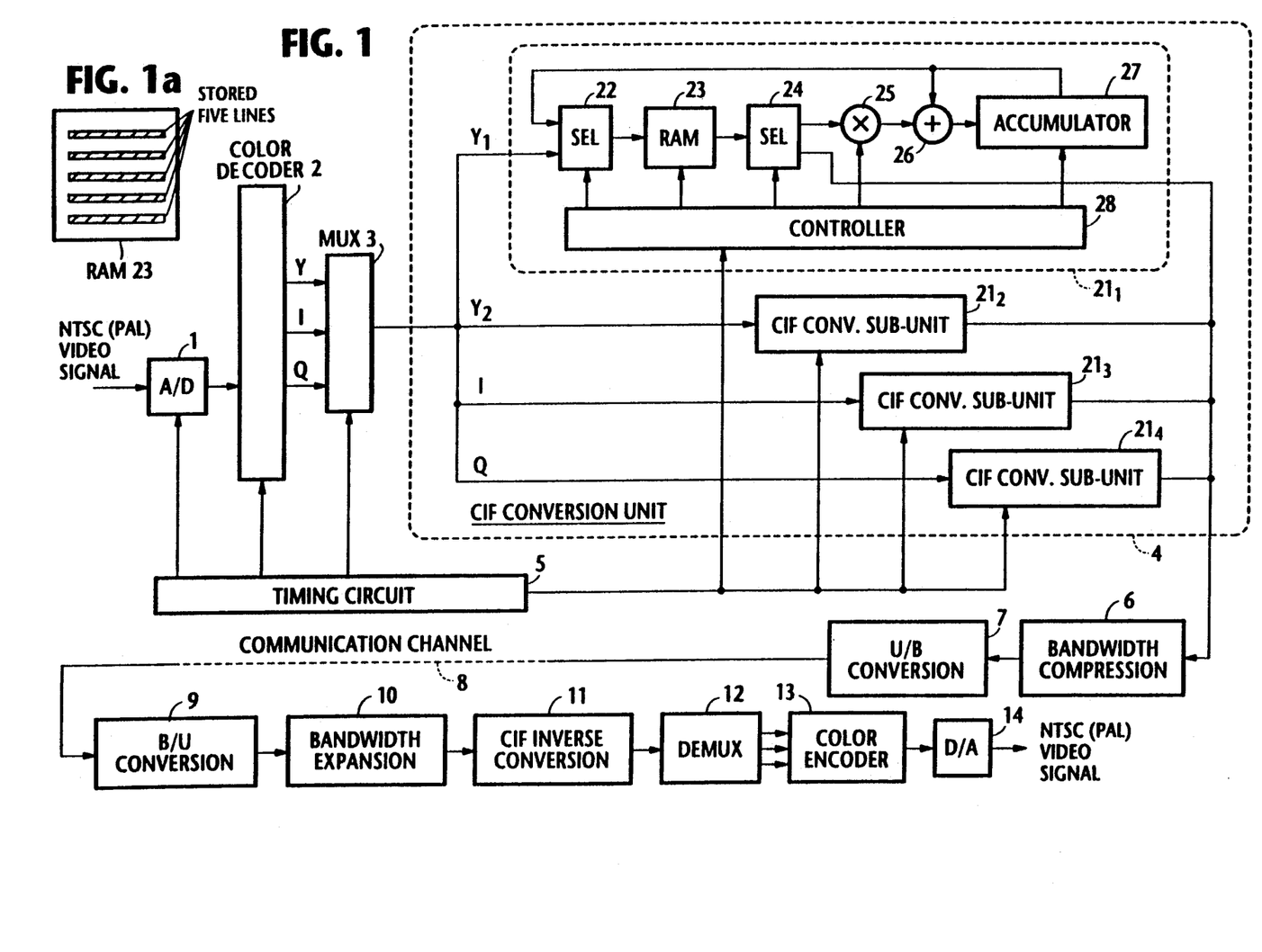
FIG. 1 is a block diagram of a video communications system incorporating a first embodiment of the CIF conversion unit of the present invention.
FIG. 1a shows five horizontal lines stored in a random access memory corresponding to the RAM 23 shown in FIG. 1
Figure 2:
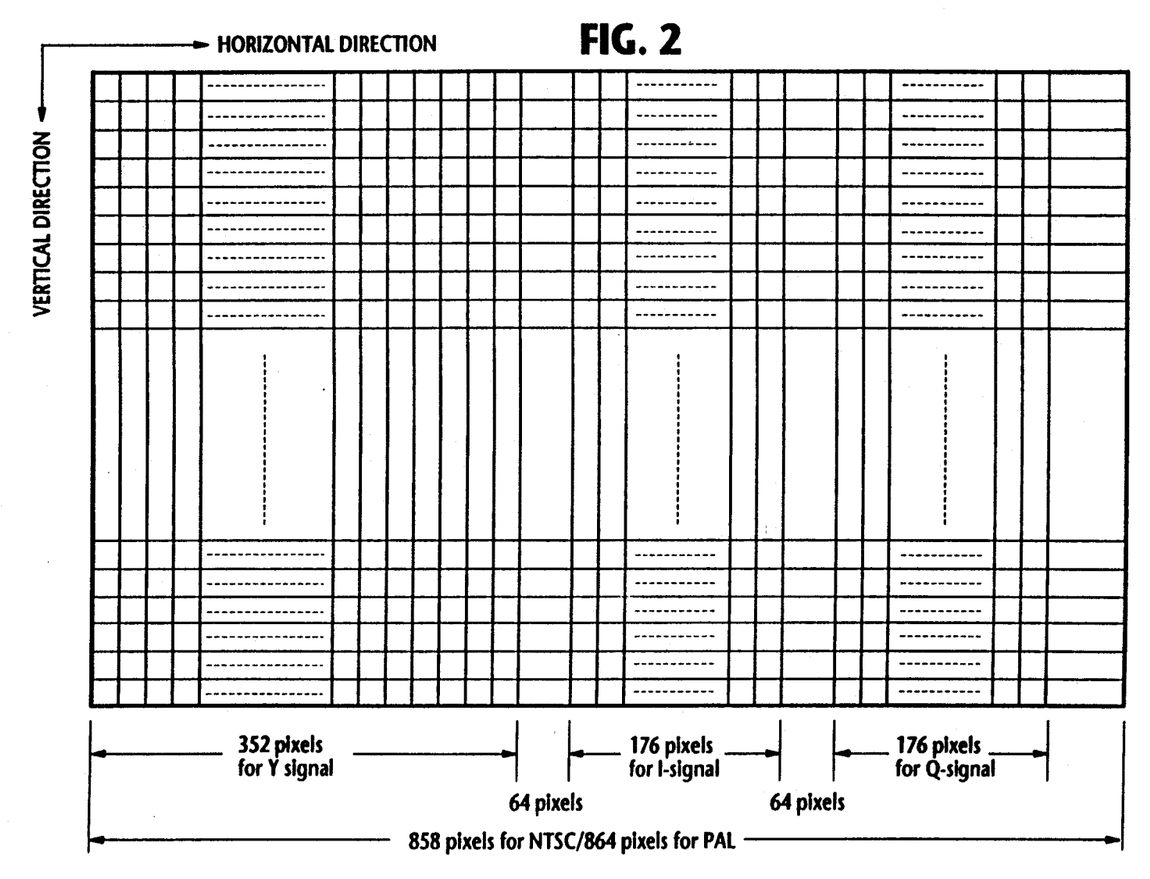
FIG. 2 is a view showing the internationally standardized common intermediate format for conversion between NTSC and PAL system formats.

Referring now to FIG. 1, there is shown a color television transmission system embodying the present invention. A the transmit end of the system, an analog NTSC or PAL video signal is sampled and converted by an A/D converter 1 to a digital signal and supplied to a color decoder 2 in which it is decoded into luminance (Y), I-channel chrominance (I) and Q-channel chrominance (Q) component signals. The outputs of color decoder 2 are applied to a time-division multiplexer 3 in which they are multiplexed. As shown in FIG. 2, the common intermediate frame format (CIF) specifies that each of 525 horizontal lines consists of a total of 858 pixels for NTSC system and 864 pixels for PAL system. For each standard color TV system, the CIF standard assigns 352 pixels for Y signal, and 176 pixels for each chrominance signal and 64 pixels for separation between these signals.

The time-division multiplexed color TV signal is applied to a CIF conversion unit 4 which is constructed according to a first embodiment of the present invention. Timing signals to A/D converter 1, decoder 2, multiplexer 3 and CIF conversion unit 4 are supplied from a timing circuit 5.

The output of the CIF conversion unit 4 is applied to a bandwidth compression circuit 6 implemented with a digital band-pass filter for compressing the bandwidth of the CIF signal so that it conforms to the bandwidth of a communication channel. The output of bandwidth compression circuit 6 is applied to a unipolar-to-bipolar converter 7 in which the signal is converted according to a specified line code for transmission through a communication channel 8 to a receive end of the system.

At the receive end, the transmitted CIF signal is converted to a unipolar format by a bipolar-to-unipolar converter 9, fed into a bandwidth expansion circuit 10 to expand the CIF signal to the original bandwidth. The output of the bandwidth expansion circuit 10 is applied to a known CIF inverse conversion unit 11 which processes the input signal in a process inverse to that of the CIF conversion unit of the transmitter. A demultiplexer 12 is connected to the output of CIF inverse conversion unit 11 to decompose the signal into Y, I and Q components. A color encoder 13 receives the outputs of demultiplexer 12 for encoding them into NTSC or PAL system format for D/A conversion by a D/A converter 14.

To reduce the number of multipliers for CIF conversion, the present invention divides the luminance component equally into a first half portion $Y_1$ and a second half portion $Y_2$ so that they can be treated as a block of 176-pixel data in the same manner as chrominance components I and Q are treated. Each CIF conversion sub-unit has the following transfer function:

$$H(z) = \Sigma a_n \cdot z^{-n}$$

where $a_n$ is a tap weight coefficient of a horizontal line n, and $z^{-n}$ represents a delay operator, where $z^{-1}$ indicates the delay time of one horizontal line and n is in the range between 1 and 5.

As illustrated in FIG. 1, the CIF conversion unit 4 comprises a plurality of CIF conversion sub-units $21_1$, $21_2$, $21_3$ and $21_4$ of identical configuration connected to the output of multiplexer 3 to receive luminance components $Y_1$, $Y_2$, chrominance components I and Q, respectively. Each CIF conversion sub-unit 21 includes a selector 22 having two input terminals, one of which is coupled to the output of multiplexer 3. The output of selector 22 is connected to a dual-port RAM (random access memory) 23 for storing 1056 words, or pixels of video signal. Namely, the RAM 23 is capable of storing $176 \times 5$ pixels of input signals that occur on five successive horizontal lines plus 176 pixels of a processed version of the five-line video signal. The output of RAM 23 is coupled to the input of a selector 24 having two output terminals, one being coupled to a multiplier 25 in which it is successively multiplied with a tap weight coefficient $a_n$ (where n = 1–5) supplied from a controller 28. The other output terminal of selector 24 is the output terminal of the sub-unit and is connected together with corresponding output terminals of the other CIF conversion sub-units to the input of bandwidth compression circuit 6. The output of multiplier 25 is applied to one input of an adder 26 in which it is summed with a signal from an accumulator 27 to which the output of adder 26 is connected. An integrator is formed by the adder 26 and accumulator 27 to produce a weighted and summed output. The output of accumulator 27 is applied to the second input terminal of selector 22. Selectors 22 and 24, RAM 23 and accumulator 27 are controlled in response to signals supplied from controller 28. Controller 28 receives a timing signal from timing circuit 5 to control selectors 22, 24 and RAM 23.

Figure 3:
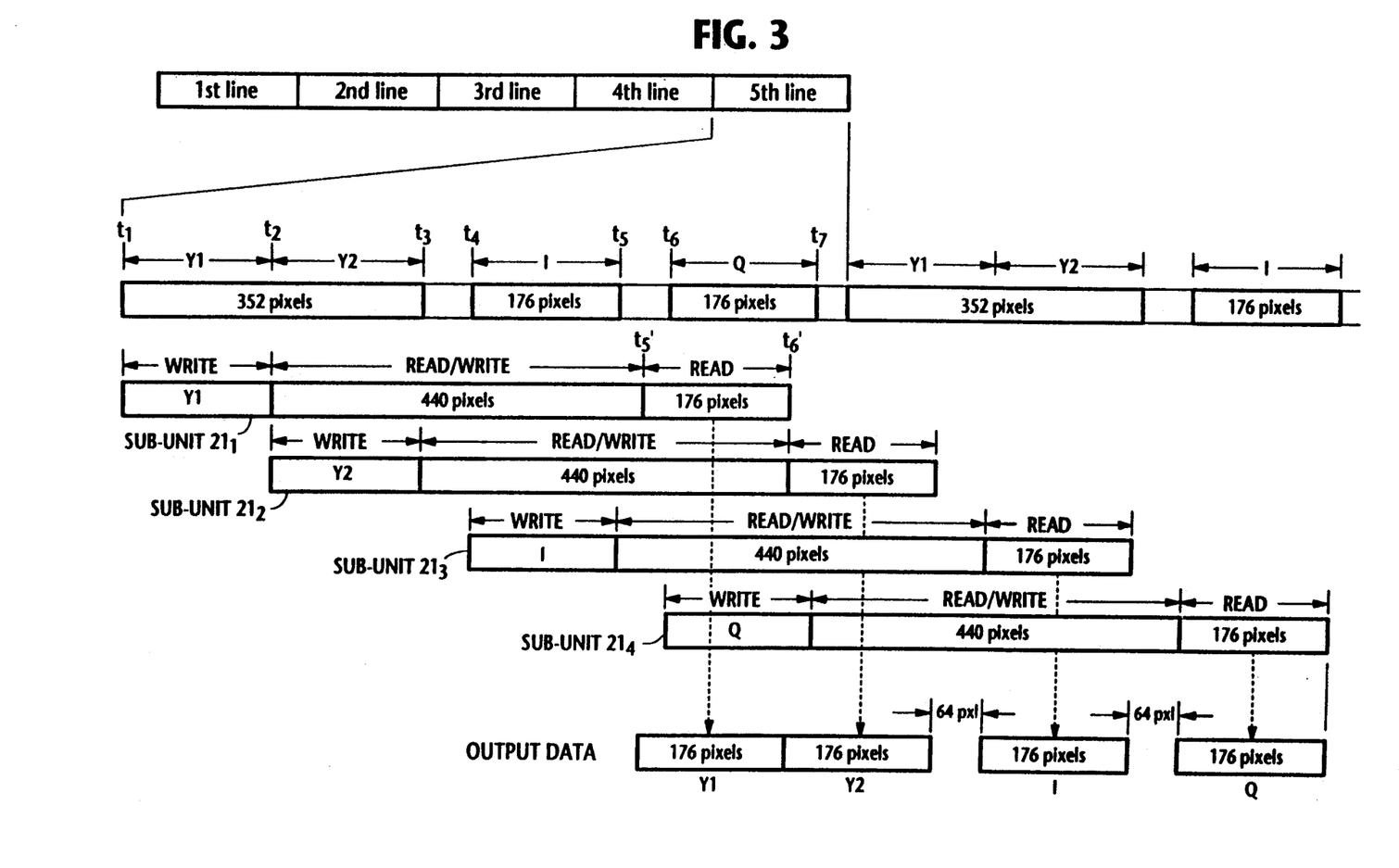
FIG. 3 is a timing diagram associated with the embodiment of FIG. 1.

The operation of each CIF conversion sub-unit will be described with reference to FIG. 3. The controller 28 of each CIF conversion sub-unit is constantly monitoring the signal from the timing circuit 5 to detect when to establish a passage from the output of multiplexer 3 to RAM 23 and cause the latter to sequentially write an associated one of the 176-pixel data from multiplexer 3 during five successive horizontal lines. The controller 28 of sub-unit $21_1$ supplies write address codes to RAM 23 during the $Y_1$-period of first to fifth lines so that 880-pixel data of the $Y_1$ component is stored into an 880-word storage area of the memory during times $t_1$ and $t_2$. Likewise, the $Y_2$, I and Q components of every first to fifth lines are stored respectively into the RAM's of sub-units $21_2$, $21_3$ and $21_4$ during successive 176-pixel intervals $t_2$–$t_3$, $t_4$–$t_5$, and $t_6$–$t_7$.

During this five-line data entry mode, selector 22 of each sub-unit is switched to the lower input terminal and at the end of this mode, it is transferred to the upper input terminal and RAM 23 is supplied with read address codes at twice the rate at which the input data is written in. These read address codes specify data that occur on corresponding pixel positions of the first to fifth lines to produce a set of five pixel components spaced 858 (or 864) pixels apart from each other. Five pixel components of each set from RAM 23 are passed through selector 24 to multiplier 25 in which they are multiplied respectively with a tap weight $a_n$ according to the CIF conversion algorithm and supplied to adder 26 and thence to accumulator 27 to produce a summed output. RAM 23 is supplied with a write address for writing the summed output into a 176-word storage area of the memory at 2/5 times the data entry rate. Thus, RAM 23 is in a read/write mode when all 880 pixel data are read out of the memory and processed to produce 176 summed outputs. During this read/write mode, selector 22 remains in the upper input terminal and selector 24 is transferred to the upper output terminal to enable the 176 summed outputs to be stored into RAM 23.

Therefore, all 880-stored pixel data are processed during an interval between time $t_2$ and time $t_5'$ which occurs somewhere between times $t_5$ and $t_6$. This interval corresponds to a count of 440 pixels which would otherwise be continuously read out of RAM 23 at the pixel data entry rate. At time $t_5'$, selector 24 is transferred to the lower output terminal for providing a passage to the bandwidth compression circuit 6.

RAM 23 is now switched to a read mode in which it is supplied with read address codes at a rate equal to the data entry rate to read the processed 176-pixel data out of the memory through selector 24 to the output of sub-unit $21_1$. This read mode terminates at time $t_6'$ which corresponds to the 792th pixel point from the first pixel point.

Identical accumulation processes proceed with other sub-units $21_2$, $21_3$ and $21_4$, beginning respectively at times $t_2$, $t_4$, and $t_6$, and CIF converted output data is generated by combining the time-sequentially generated outputs of the CIF conversion sub-units 21 with an interval of 64 pixels being interposed between $Y_2$ and 1 signals and between 1 and Q signals.

Figure 4:
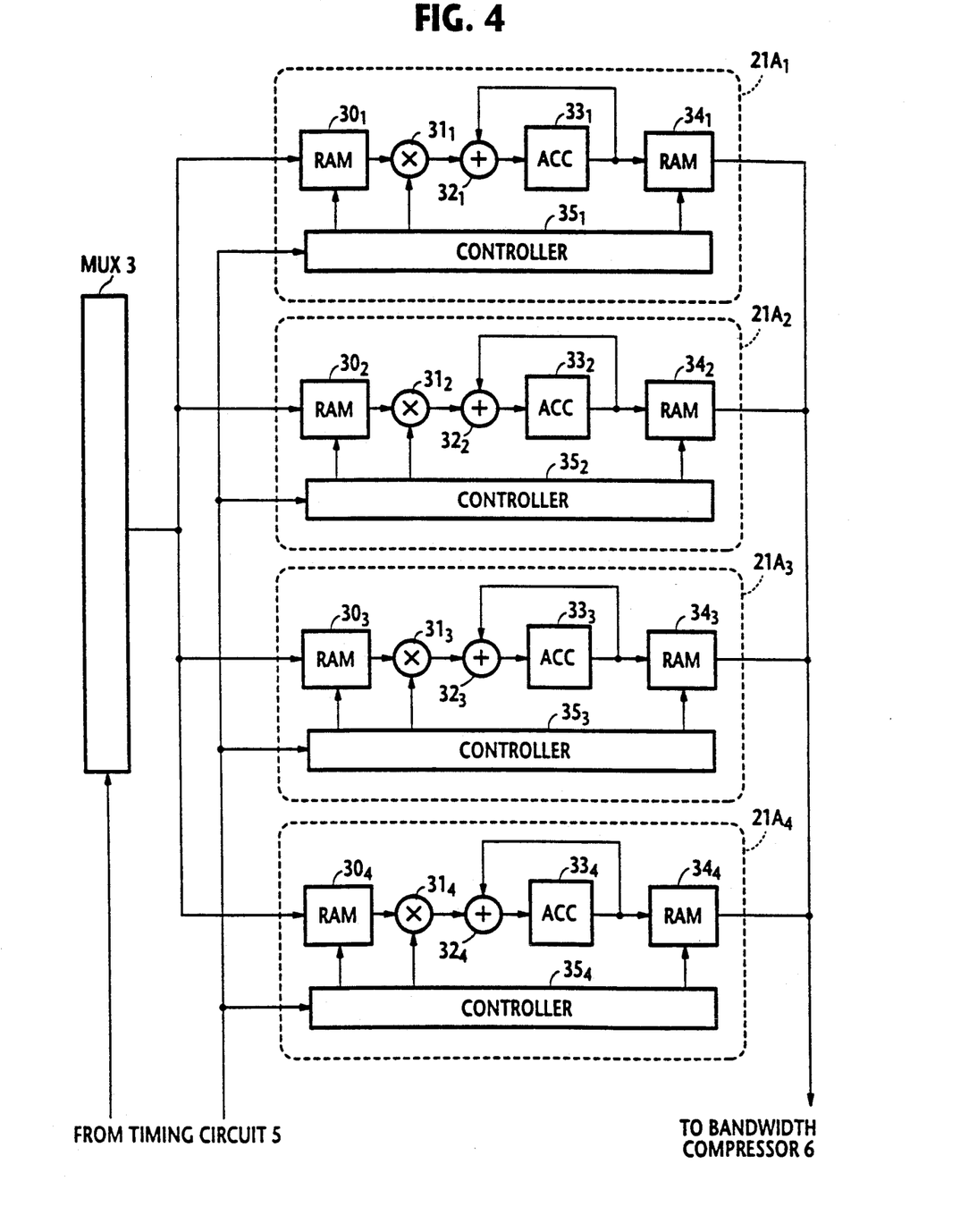
FIG. 4 is a block diagram of a modification of the embodiment of FIG. 1.
Figure 5:
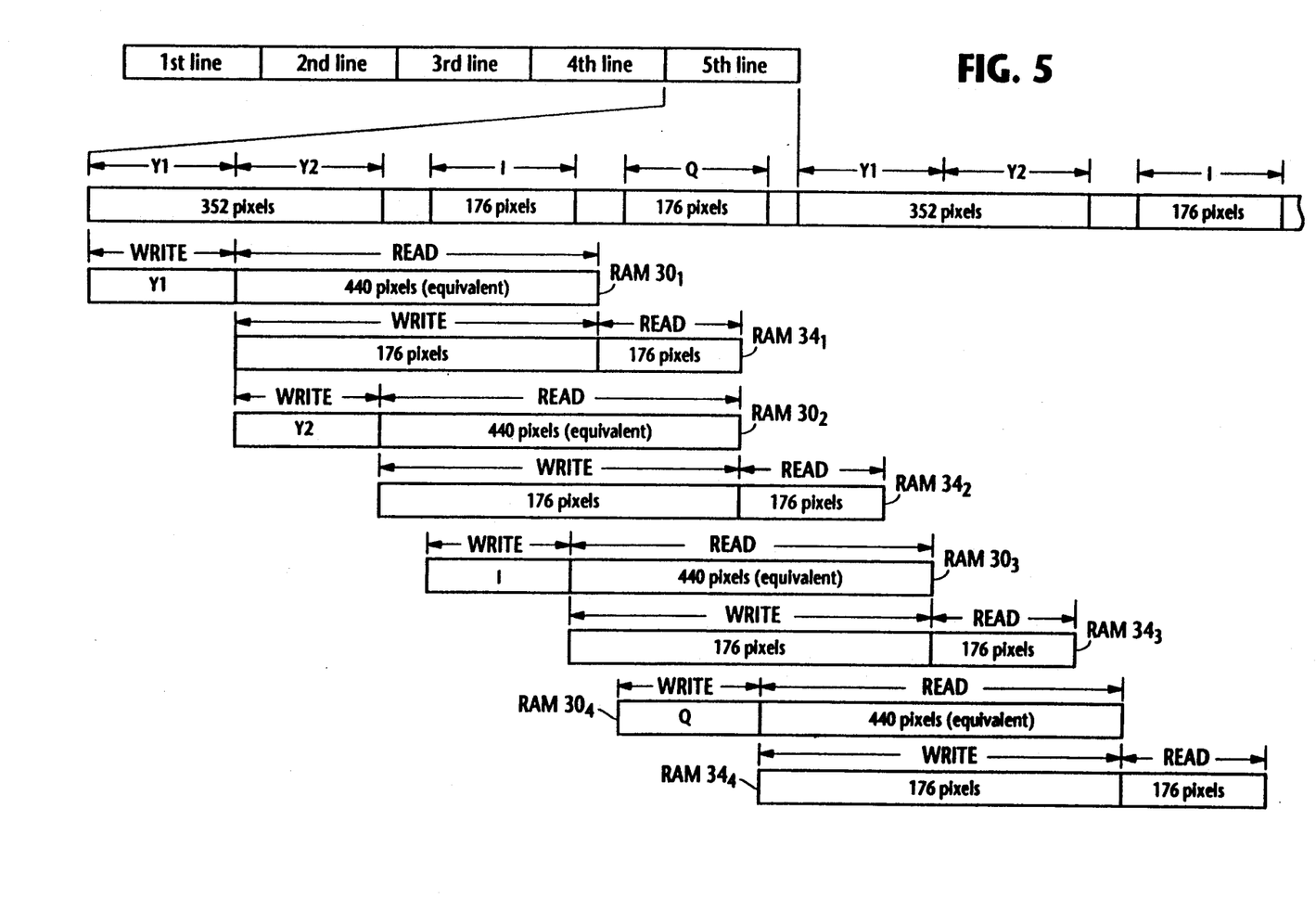
FIG. 5 is a timing diagram associated with the modification of FIG. 4.

An alternative form of the CIF conversion unit of FIG. 1 is shown in FIG. 4 in which two single-port random access memories 30 and 34 are employed for each of the CIF conversion sub-units, instead of a single dualport random access memory and two selectors. Each CIF conversion sub-unit $21A_i$ (where i=1,2,3 and 4) comprises an input RAM $30_i$, a multiplier $31_i$, an adder $32_i$, an accumulator $33_i$, an output RAM $34_i$ and a controller $35_i$. The input RAM $30_i$ has a capacity of 880 words and output RAM $34_i$ has a capacity of 176 words. As illustrated in FIG. 5, RAM $30_1$ stores 880 pixels of the $Y_1$ component in a write mode which is followed by a read mode in which all 880 pixel data are read out of the memory at twice the data entry rate and processed through multiplier $31_1$, $32_1$ and $33_1$ in the same manner as described above. During this read mode of RAM $30_i$, output RAM $34_1$ is driven at 2/5 times the data entry rate to store 176 summed outputs of the $Y_1$ component from accumulator $33_1$. At the end of the accumulation process, RAM $34_1$ is driven at the same rate as the data entry rate in a read mode. Similar accumulation processes and data reading occur in other CIF conversion sub-units 21 $A_2$ through $21_4$.

Figure 6:
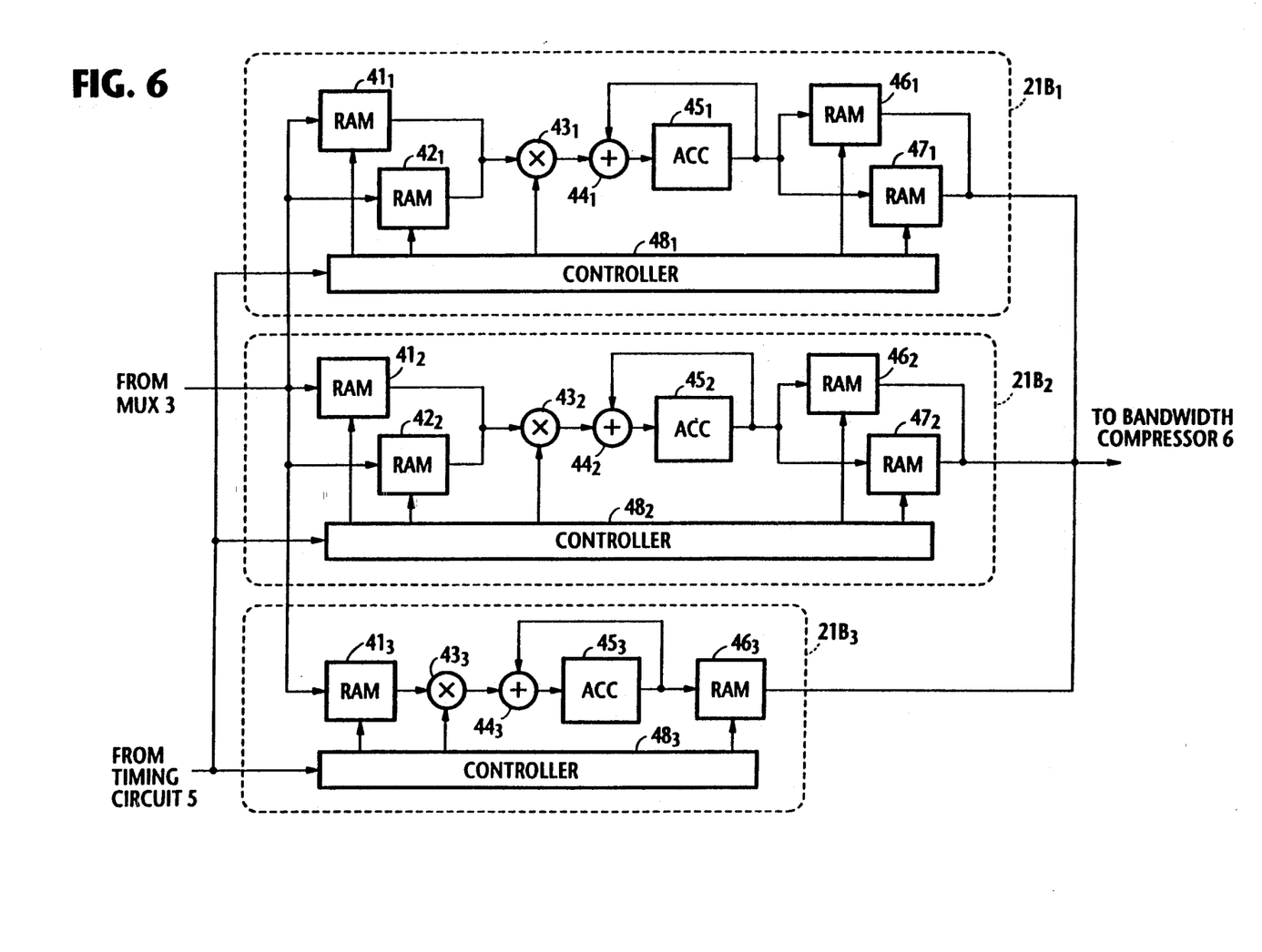
FIG. 6 is a block diagram of a second embodiment of the CIF conversion unit of the invention.

FIG. 6 is a block diagram of a further embodiment of the present invention in which the number of multipliers is reduced to three. This is achieved by time sharing a first multiplier with the luminance component $Y_1$ and a first half-section of the chrominance component 1 and time sharing a second multiplier with the luminance component $Y_2$ and a second half-section of the chrominance component 1, and exclusively using the third multiplier for processing the chrominance component Q.

The CIF conversion unit of FIG. 6 comprises two CIF conversion sub-unit $21B_1$ and $21B_2$ of identical configuration and one CIF conversion sub-unit $21B_3$. Each of the sub-units $21B_i$ (where i=1 and 2) comprises two input RAM's $41_i$ and $42_i$ with memory capacities of 880 and 440 words, respectively. The outputs of RAM's 41 and 42 are coupled together to the CIF conversion circuit formed by multiplier $43_i$, adder $44_i$ and accumulator $45_i$. Two output RAM's $46_i$ and $47_i$ with respective capacities of 173 and 88 words are connected to the output of accumulator $45_i$. The third sub-unit $21B_3$ differs from the other sub-units by using only one input RAM $40_3$ and an output RAM $46_3$.

In the first sub-unit $21B_1$, the input RAM's $41_1$ and $42_1$ are driven by controller $48_1$ to store 880-pixel data of the luminance component $Y_1$ in RAM $41_1$ and 440-pixel data of the first half segment $l_1$ of the chrominance component 1 in RAM $42_1$. Data stored in each of these input RAM's are retrieved at twice the data entry speed. RAM $46_1$ is driven at 2/5 times the data entry speed to store 176 summed outputs of the luminance component $Y_1$, while RAM $47_1$ is driven at the same speed as RAM $46_1$ to store 88 summed outputs of the chrominance component $l_1$.

In a similar manner, the input RAM's $41_2$ and $42_2$ of the second sub-unit $21B_2$ store 880-pixel data of the luminance component $Y_2$ and 440-pixel data of the second half segment $l_2$ of the chrominance component 1, respectively, the stored data being retrieved at twice the data entry speed. RAM $46_2$ is driven at 2/5 times the data entry speed to store 176 summed outputs of the luminance component $Y_2$, while RAM $47_2$ is driven at the same speed as RAM $46_2$ to store 88 summed outputs of the chrominance component $l_2$. The third sub-unit $21B_3$ operates in the same manner as the CIF conversion sub-unit $21A_4$ of the previous embodiment.

Figure 7:
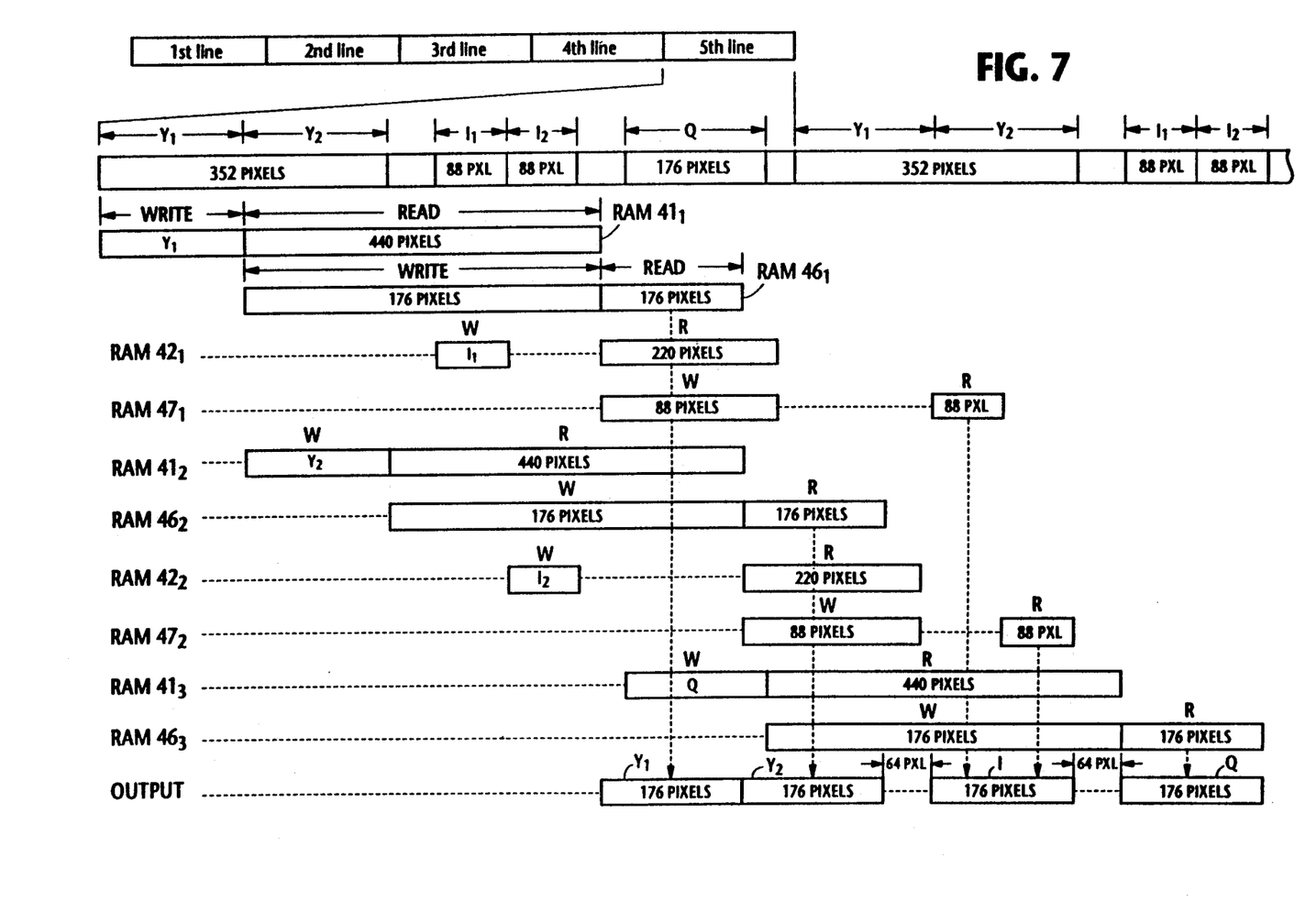
FIG. 7 is a timing diagram associated with the embodiment of FIG. 6.

As will be seen from FIG. 7, the operation of the circuit of FIG. 6 differs from the embodiment of FIG. 4 in that 88-pixel data of the first half-segment of the chrominance component $l_1$ is written into input RAM $42_1$ while the luminance components $Y_1$ stored in RAM $41_1$ is being read for accumulation process. When all data are read out of RAM $41_1$ and the processed data are stored into RAM $46_1$, the latter is driven in a read mode at a speed equal to the data writing speed to deliver the processed 176-pixel luminance component $Y_1$ to the bandwidth compression circuit 6. At the same time, RAM $42_1$ is driven in a read mode at twice the data entry speed for processing the chrominance component $l_1$ and RAM $47_1$ is driven in a write mode at 2/5 times the data entry speed to store 88 pixels of the processed $l_1$ chrominance component.

On the other hand, similar processes proceed in the second sub-unit $21B_2$ so that a processed version of the luminance component $Y_2$ is delivered to the bandwidth compression circuit 6 subsequent to the delivery of the luminance component $Y_1$.

The 88-pixel data of the processed chrominance component $l_1$ is read out of RAM $47_1$ after an interval of 64 pixels following the end of delivery of the luminance component $Y_2$, and the 88-pixel data of the processed chrominance component $l_2$ is read out of RAM $47_2$ immediately following the end of delivery of the chrominance component $l_1$.

A processed version of the chrominance component Q is obtained in RAM $46_3$ after a 64-pixel interval following the delivery of chrominance component $l_2$ and is sequentially read from RAM $46_3$, completing a CIF line output signal.

Figure 8:
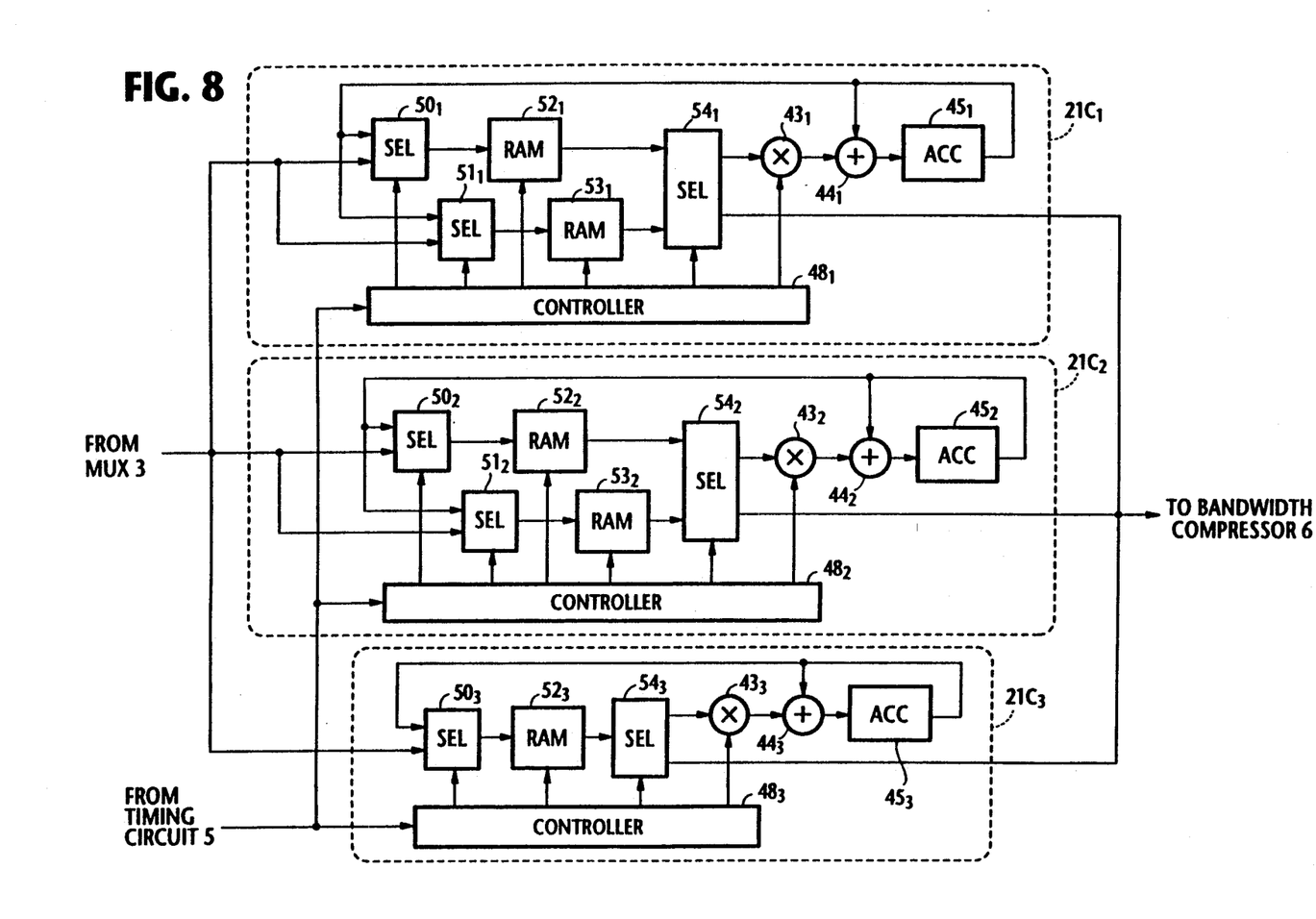
FIG. 8 is a block diagram of a modification of the embodiment of FIG. 6.

The embodiment of FIG. 6 can be modified as shown in FIG. 8 by a shared use of a dual-port RAM for the entry of input data and the delivery of output data in manner similar to the approach taken by the embodiment of FIG. 1. In FIG. 8, selectors $50_i$ and $51_i$ are provided in each of the CIF conversion sub-units $21C_i$ (where i=1 and 2) and a single selector $50_3$ is provided in the third sub-unit $21C_3$. Each of these selectors has two input terminals, one being coupled to the output of multiplexer 3 and the other being coupled to the output of accumulator $45_i$. Dual-port RAM's $52_i$ and $53_i$ are connected respectively to the outputs of selectors $50_i$ and $51_i$, and a dual-port RAM $52_3$ is connected to the output of selector $50_3$. Selector $54_i$ selectively applies one of the output signals from RAM's $52_i$ and $53_i$ to multiplier $43_i$ or bandwidth compression circuit 6.

Figure 9:
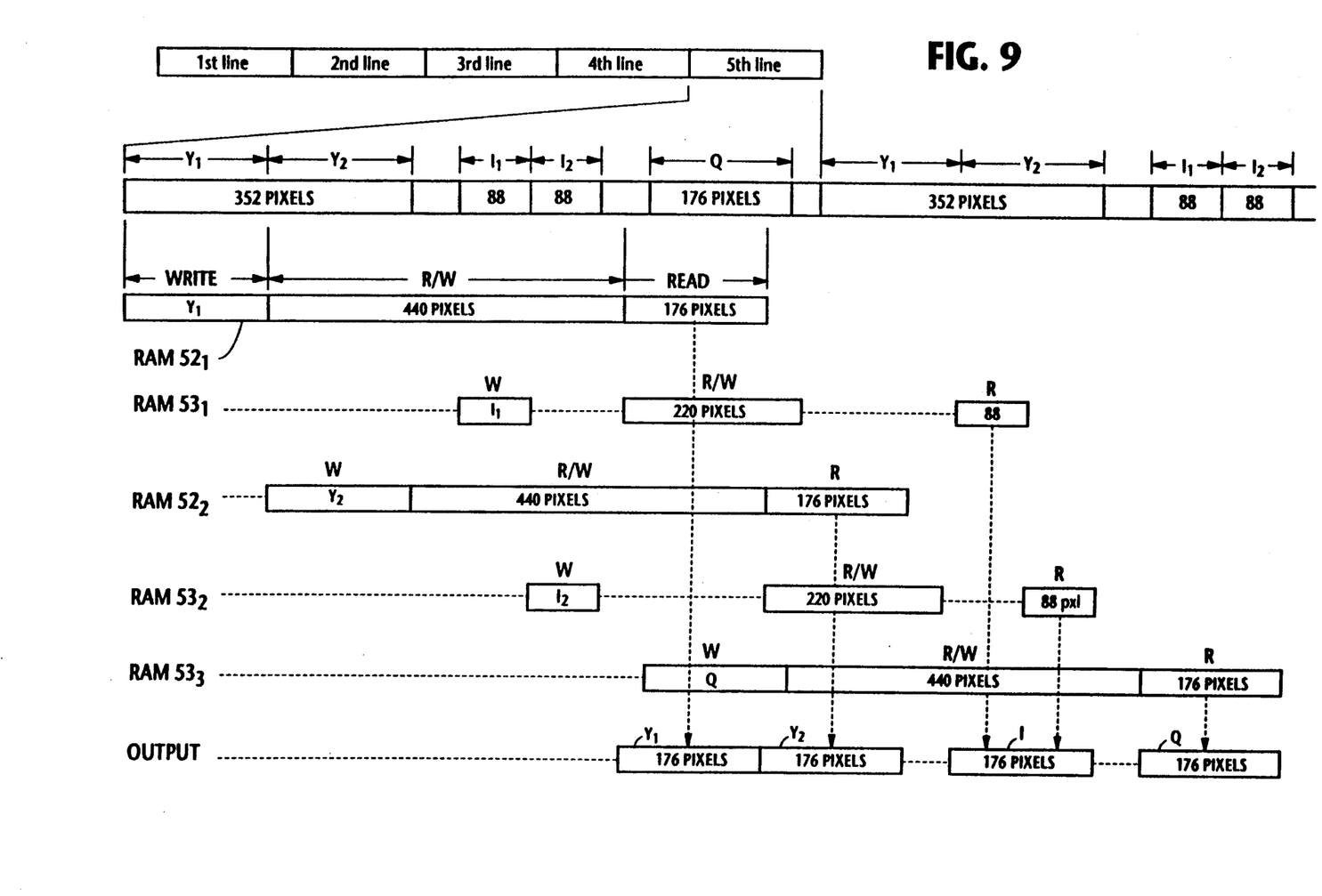
FIG. 9 is a timing diagram associated with the modification of FIG. 8.

As seen in FIG. 9, following a write mode in which selectors $50_i$ are in their lower input position, these selectors are switched to the upper input position and RAM's $52_1$, $52_2$ and $52_3$ are driven in a read/write mode for processing 880-pixel $Y_1$, $Y_2$ and Q component signals through selectors $54_1$ and $54_2$. While data in RAM's $52_1$ and $52_2$ are being processed through their accumulators, the first and second half segments of chrominance components $l_1$ and $l_2$ are written into RAM's $53_1$ and $53_2$, respectively.

Upon completion of the accumulation processes on $Y_1$ and $Y_2$ data, selectors $51_1$ and $51_2$ are switched to the upper input position coupling the outputs of accumulators $45_1$ and $45_2$ to RAM's $53_1$ and $53_2$, respectively, and selectors $54_1$ and $54_2$ are switched to the lower input position coupling the output of RAM's $53_1$ and $53_2$ to multipliers $43_1$ and $43_2$, respectively, to proceed with the accumulation processes on the chrominance components $l_1$ and $l_2$ by driving RAM's $53_1$ and $53_2$ in a read/write mode. RAM $52_3$ is driven in a read/write mode for processing chrominance component Q with selector $54_3$ being switched to the upper output position. While the accumulation processes are being performed on signals from RAM's $53_1$ and $53_2$, selectors $54_1$ and $54_2$ establish a path for coupling the outputs of RAM's $52_1$ and $52_2$ to the output terminal of the CIF converter.

After an interval of 64 pixels following the end of delivery of the luminance component $Y_2$, selector $54_1$ is switched to the lower output position and the 88-pixel data of the processed chrominance component $l_1$ is read out of RAM $53_1$, and immediately following the end of delivery of the chrominance component $l_1$, selector $54_2$ is switched to the lower output position and the 88-pixel data of the processed chrominance component $l_2$ is read out of RAM $53_2$. A processed version of the chrominance component Q is obtained in RAM $52_3$ after a 64-pixel interval following the delivery of chrominance component $l_2$. When this occurs, selector $54_3$ is switched to the lower output position and the contents of RAM $52_3$ are read out of RAM $53_3$.

What is claimed is:

1. A common intermediate frame (CIF) converter for converting an input color television signal in an NTSC (National Television Standard Committee) or PAL (Phase Alternation by Line) system format into a CIF format, comprising:
   memory means;
   N multipliers, where N is smaller than five;
   N integrators connected respectively to outputs of said N multipliers; and
   control means for storing every five horizontal lines of said input color television signal into said memory means, transferring on a pixel-by-pixel basis first and second half segments of a luminance component of the stored lines and I and Q chrominance components of the stored lines from corresponding pixel positions of said memory means to said N multipliers at a speed higher than a writing speed at which said input signal is stored into said memory means, and supplying tap weight coefficients to said N multipliers, said tap weight coefficients having unique values corresponding respectively to said five horizontal lines, said control means further storing outputs of said N integrators into said memory means and sequentially transferring the stored outputs from said memory means at said writing speed to an output terminal of said converter.

2. A common intermediate frame (CIF) converter for converting an input color television signal in an NTSC (National Television Standard Committee) or PAL (Phase Alternation by Line) system format into a CIF format, comprising:
   memory means;
   first, second, third and fourth multipliers;
   first, second, third and fourth integrators connected respectively to outputs of said first, second, third and fourth multipliers; and
   control means for storing every five horizontal lines of said input color television signal into said memory means, transferring on a pixel-by-pixel basis first and second half segments of a luminance component and I and Q chrominance components of the stored lines from corresponding pixel positions of said memory means to said first, second, third and fourth multipliers respectively at a speed higher than a writing speed at which said input signal is stored into said memory means, and supplying tap weight coefficients to said first, second, third and fourth multipliers, said tap weight coefficients having unique values corresponding respectively to said five horizontal lines, said control means further storing outputs of said first, second, third and fourth integrators into said memory means and sequentially transferring the stored outputs of said first, second, third and fourth integrators from said memory means at said writing speed to an output terminal of said converter.

3. A common intermediate format (CIF) converter for converting an input color television signal in an NTSC (National Television Standard Committee) or PAL (Phase Alternation by Line) system format into a CIF format, comprising:
   memory means;
   first, second and third multipliers;
   first, second and third integrators connected respectively to outputs of said first, second and third multipliers; and
   control means for storing every five horizontal lines of said input color television signal into said memory means, transferring on a pixel-by-pixel basis from corresponding pixel positions of the stored lines at a reading speed higher than a writing speed at which said signal is stored into said memory means a first half segment of a luminance component and a first half segment of an I chrominance component of the signal to said first multiplier, a second half segment of the luminance component and a second half segment of the I chrominance component to said second multiplier, and a Q chrominance component of the signal to said third multiplier, and supplying tap weight coefficients to said first, second and third multipliers, said tap weight coefficients having unique values corresponding respectively to said five horizontal lines, said control means further storing outputs of said first, second and third integrators into said memory means and transferring the stored outputs from said memory means at said writing speed to an output terminal of said converter.

4. A common intermediate format (CIF) converter for converting an input color television signal in an NTSC (National Television Standard Committee) or PAL (Phase Alternation by Line) system format into a CIF format, comprising:
   first, second, third and fourth memory means;

first, second, third and fourth multipliers connected respectively to said first, second, third and fourth memory means;

first, second, third and fourth integrators connected respectively to outputs of said first, second, third and fourth multipliers; and control means for storing first and second half segments of a luminance component of every five horizontal lines of said input color television signal into said first and second memory means respectively and I and Q chrominance components of said five horizontal lines into said third and fourth memory means respectively, transferring on a pixel-by-pixel basis signals in corresponding pixel positions of the five horizontal lines from said first, second, third and fourth memory means at a speed higher than a writing speed at which said input signal is stored into said memory means, and supplying tap weight coefficients to said first, second, third and fourth multipliers, said tap weight coefficients having unique values corresponding respectively to said five horizontal lines, said control means further storing outputs of said first, second, third and fourth integrators into said first, second, third and fourth memory means, respectively, and sequentially transferring the stored outputs from said first, second, third and fourth memory means at said writing speed to an output terminal of said converter.

5. A common intermediate format (CIF) converter as claimed in claim 4, wherein each half segment of said luminance component and each of the chrominance components has 176 pixels along each of the horizontal lines, wherein each of said first, second, third and fourth memory means comprises a first memory with a storage capacity of 880 words for storing 880 pixels of said color television signal and a second memory with a storage capacity of 176 words for storing 176 pixels of the output of a corresponding one of said integrators.

6. A common intermediate format (CIF) converter for converting an input color television signal in an NTSC (National Television Standard Committee) or PAL (Phase Alternation by Line) system format into a CIF format, comprising:

first, second, third, fourth and fifth memory means;
first, second and third multipliers;
first, second and third integrators connected respectively to outputs of said first, second and third multipliers; and control means for storing first and second half segments of a luminance component of every five horizontal lines of said input color television signal into said first and third memory means respectively, first and second half segments of an I chrominance component of said five lines into said second and fourth memory means respectively, and a Q chrominance component of said five horizontal lines into said fifth memory means, transferring on a pixel-by-pixel basis signals in corresponding pixel positions of the horizontal lines from said first and second memory means in sequence to said first multiplier, from said third and fourth memory means in sequence to said second multiplier and from said fifth memory means to said third multiplier at a speed higher than a writing speed at which said input signal is stored into said memory means, and supplying tap weight coefficients to said first, second and third multipliers, said tap weight coefficients having unique values corresponding respectively to said five horizontal lines, said control means further storing outputs of said first, second and third integrators into said first, second, third, fourth and fifth memory means and transferring the stored outputs from said first, second, third, fourth and fifth memory means at said writing speed to an output terminal of said converter.

7. A common intermediate format (CIF) converter as claimed in claim 6, wherein each half segment of said luminance component and each of the chrominance components has 176 pixels along each of the horizontal lines, wherein each of said first, third and fifth memory means comprises a first memory with a storage capacity of 880 words for storing 880 pixels of said color television signal and a second memory with a storage capacity of 176 words for storing 176 pixels of the output of a corresponding one of said integrators, and wherein each of said second and fourth memory means comprises a first memory with a capacity of 440 words for storing 440 pixels of said color television signal and a second memory with a capacity of 88 words for storing 88 pixels of the output of a corresponding one of said integrators.

8. A video communications system comprising:

an analog-to-digital converter for converting an analog color television signal in an NTSC ((National Television Standard Committee) or PAL (Phase Alternation by Line) system format into a corresponding digital color television signal;

a color decoder for decomposing said digital color television signal into a 352-pixel luminance component signal Y, a 176-pixel chrominance component signal I and a 176-pixel chrominance component signal Q;

time-division multiplexer means for multiplexing said component signals Y, I and Q so that said component signals Y, I and Q are spaced apart by a predetermined amount of pixels;

memory means;

N multipliers, where N is smaller than five;

N integrators connected respectively to outputs of said N multipliers; and control means for storing every five horizontal lines of said component signals Y, I and Q into said memory means, transferring on a pixel-by-pixel basis first and second half segments of the signal Y of the stored lines and the signals I and Q of the stored lines from corresponding pixel positions of said memory means to said N multipliers at a speed higher than a writing speed at which said component signals are stored into said memory means, and supplying tap weight coefficients to said N multipliers, said tap weight coefficient having unique values corresponding respectively to said five horizontal lines, said control means further storing outputs of said N integrators into said memory means and sequentially reading the stored outputs from said memory means at said writing speed for transmission.

* * * * *